(12) United States Patent
Ishibashi

(10) Patent No.: US 9,903,416 B2
(45) Date of Patent: Feb. 27, 2018

(54) BEARING DEVICE AND METHOD FOR MANUFACTURING BEARING DEVICE

(71) Applicant: NSK LTD., Tokyo (JP)

(72) Inventor: Yutaka Ishibashi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/506,356

(22) PCT Filed: Aug. 19, 2015

(86) PCT No.: PCT/JP2015/073225
§ 371 (c)(1),
(2) Date: Feb. 24, 2017

(87) PCT Pub. No.: WO2016/031644
PCT Pub. Date: Mar. 3, 2016

(65) Prior Publication Data
US 2017/0254363 A1     Sep. 7, 2017

(30) Foreign Application Priority Data
Aug. 27, 2014   (JP) .................. 2014-173031

(51) Int. Cl.
*F16C 35/04*     (2006.01)
*F16C 19/06*     (2006.01)
*F16C 33/58*     (2006.01)

(52) U.S. Cl.
CPC ............ *F16C 35/045* (2013.01); *F16C 19/06* (2013.01); *F16C 33/58* (2013.01);
(Continued)

(58) Field of Classification Search
CPC .................................................. F16C 35/045
See application file for complete search history.

(56) References Cited

U.S. PATENT DOCUMENTS 7,246,948 B2 *  7/2007  Fisk ................... B21D 19/088
                                                  384/537
9,222,518 B2 * 12/2015  Beyfuss ............... F16C 35/077
(Continued)

FOREIGN PATENT DOCUMENTS

DE    102004031830 A1    1/2006
JP    2010-242855 A     10/2010
(Continued)

OTHER PUBLICATIONS

International Search Report, issued by International Searching Authority in corresponding International Application No. PCT/JP2015/073225, dated Nov. 2, 2015, (PCT/ISA/210).
(Continued)

*Primary Examiner* — Thomas R Hannon
(74) *Attorney, Agent, or Firm* — Sughrue Mion, PLLC

(57) ABSTRACT

An outer ring (31) has a small-diameter step portion (37) comprising a step portion outer peripheral surface (37a) and a step surface (37b), and a engagement groove (37c) is formed in the step portion outer peripheral surface (37a). The inner peripheral surface of a retainer plate (40) is provided with a small-diameter hole portion (41) facing the step portion outer peripheral surface (37a), and a large-diameter hole portion (42) facing the outer peripheral surface (31a) of the outer ring (31) and guiding a rolling bearing (30). The retainer plate (40) is provided with a plurality of engagement claws (49) for locking into the engagement groove (37c), the engagement claws protruding diametrically inward from the inner periphery of the small-diameter hole portion (41), and the retainer plate (40) and the rolling bearing (30) are inseparably assembled by locking the engagement claws (49) into the engagement groove (37c).

5 Claims, 12 Drawing Sheets

(52) U.S. Cl.
  CPC ...... *F16C 2226/52* (2013.01); *F16C 2226/60* (2013.01); *F16C 2361/61* (2013.01)

(56) References Cited

U.S. PATENT DOCUMENTS

| | | | |
|---|---|---|---|
| 9,261,142 B2 * | 2/2016 | Mola | F16C 33/586 |
| 9,388,858 B2 * | 7/2016 | Mola | F16C 33/586 |
| 9,644,682 B2 * | 5/2017 | Beck | F16C 35/077 |

FOREIGN PATENT DOCUMENTS

| | | | |
|---|---|---|---|
| JP | 4877044 B2 | 2/2012 | |
| JP | 2014-29196 A | 2/2014 | |

OTHER PUBLICATIONS

Written Opinion, issued by International Searching Authority in corresponding International Application No. PCT/JP2015/073225, dated Nov. 2, 2015, (PCT/ISA/237).

* cited by examiner

BEARING DEVICE AND METHOD FOR MANUFACTURING BEARING DEVICE

TECHNICAL FIELD

The present invention relates to a bearing device and a method for manufacturing the bearing device, and more specifically, to a bearing device to be used for a rotation support part of a gear or the like of a transmission or a differential gear device and a method for manufacturing the bearing device.

RELATED ART

In the related art, a bearing device configured to support a rotary shaft for which a pulley, a gear and the like of a transmission for an automobile are provided has been known which includes a rolling bearing having a plurality of rolling elements arranged between an inner ring and an outer ring and a retainer plate configured to fix the rolling bearing to a housing with being in contact with an axial end surface of the outer ring of the rolling bearing. Also, in recent years, it is needed to miniaturize the automobile and the transmission. As the bearing device satisfying the need, a bearing device has been known in which a small-diameter step portion formed on an outer peripheral surface of an axial end portion of the outer ring of the rolling bearing is provided with a circumferentially extending engagement groove and engagement claws are formed on an inner periphery of the retainer plate fitted with the small-diameter step portion and are engaged with the engagement groove (for example, refer to Patent Documents 1 to 3).

FIGS. 11 and 12 depict a bearing device 100 disclosed in Patent Document 3, which includes a radial rolling bearing 110 and a substantially triangular plate-shaped retainer plate 120 configured to fix the radial rolling bearing 110 to a housing (not shown). A small-diameter step portion 112 is formed on an outer peripheral surface of an axial end portion of an outer ring 111 of the radial rolling bearing 110. An axial length L2 of the small-diameter step portion 112 is substantially the same as a plate thickness T2 of the retainer plate 120. An outer peripheral surface of the small-diameter step portion 112 is formed with an engagement groove 113 over an entire circumference thereof.

The retainer plate 120 has three attachment holes 124 provided in correspondence to respective apexes of the triangle and a fitting hole 121 in which the small-diameter step portion 112 of the outer ring 111 is fitted to be relatively rotatable. An inner periphery of the fitting hole 121 is formed with concave portions 123 of three places having a radius greater than a radius of the fitting hole 121. After fitting the small-diameter step portion 112 into the fitting hole 121, central portions in a circumferential direction of the concave portions 123 are axially pressed and plastically deformed by a punch of a press apparatus, so that engagement claws 122 protruding radially inward are formed on the inner periphery of the fitting hole 121. Thereby, the engagement claws 122 are engaged with the engagement groove 113 of the small-diameter step portion 112, so that the outer ring 111 and the retainer plate 120 are mounted to be non-separable and to be relatively rotatable.

CITATION LIST

Patent Documents

Patent Document 1: Japanese Patent No. 4,877,044B
Patent Document 2: Germany Patent Application Publication No. 102004031830A
Patent Document 3: Japanese Patent Application Publication No. 2014-29196A

SUMMARY

Problems to be Solved

In the bearing device 100 of Patent Document 3, following functions are required for the engagement claws 122 formed on the inner periphery of the fitting hole 121, for example.

1. The radial rolling bearing 110 and the retainer plate 120 are mounted to be non-separable.
2. A tip of the engagement claw 122 does not interfere with the engagement groove 113 and does not interrupt the relative rotations of the radial rolling bearing 110 and the retainer plate 120.
3. During the forming process of the engagement claws 122, a burr becoming a cause of contamination, which is caused due to the interference between the tips of the engagement claws 122 and the outer ring 111, is not generated.

In order to meet the above functions, it is important to suppress a shape unevenness of the respective engagement claws 122. To this end, upon the formation of the engagement claws 122, it is necessary to form the engagement claws 122 with the outer ring 111 and the retainer plate 120 being aligned as much as possible. Herein, the retainer plate 120 is formed to have a shape avoiding an interference with a component arranged in the transmission. Therefore, unless a dedicated mating surface for alignment is additionally formed, it is difficult to make a centering by using an outward shape of the retainer plate 120. Therefore, upon the formation of the engagement claws 122, it is necessary to fix the radial rolling bearing 110 to a mold or the like on the basis of an outer diameter of the outer ring 111 of high precision and the like, and to fit the retainer plate 120 to the outer ring 111 for positioning relative positions. At this time, when a guide gap between the outer ring 111 and the retainer plate 120 is large, a misalignment between the radial rolling bearing 110 and the retainer plate 120 is large, so that lengths of the formed engagement claws 122 are different depending on places, i.e., the shapes of the engagement claws 122 may be unstable. In order to precisely position the radial rolling bearing 110 and the retainer plate 120, an outer diameter of the small-diameter step portion 112 of the outer ring 111 and an inner diameter of the fitting hole 121 of the retainer plate 120 are necessarily processed with high precision (a tolerance should be reduced as much as possible). To this end, the heat-treated outer ring 111 and retainer plate 120 are to be subjected to further processing such as turning processing and grinding processing. Since the corresponding processing is processing of removing a material hardened due to the heat treatment, it is very difficult to cut the material, which increases the manufacturing cost of the bearing device 100.

In general, an outer peripheral surface 111a and both side surfaces 111b of the outer ring 111 are subjected to the grinding processing so as to improve the attachment precision to the housing or the like. In the case of the outer ring 111 of Patent Document 3, an outer diameter of the small-diameter step portion 112 to which the retainer plate 120 is to be fitted is also necessarily subjected to the further grinding processing. Also, in order to prevent the interference with the outer ring 111 upon the formation of the engagement claws 122, the fitting hole 121 has a complex shape that the concave portions 123 are formed on the inner periphery, not a single circle, so that the processing man-hour increases.

Also, it may be possible to form the engagement claws 122 without performing the further processing while keeping the large gap between the outer ring 111 and the retainer plate 120. In this case, however, it is necessary to make lengths of the engagement claws 122 long so that the engagement claws 122 do not separate from the engagement groove 113 even when the outer ring 111 and the retainer plate 120 are largely eccentric within a range of the guide gap. In order to prevent the interference with tips of the long engagement claws 122, a depth of the engagement groove 113 is deepened, the strength of the outer ring 111 is lowered and a quenching crack may be caused in a thickness-reduced part upon quenching.

The present invention has been made in view of the above situations, and an object of the present invention is to provide a bearing device and a method for manufacturing the bearing device capable of positioning an outer ring and a retainer plate with high precision by a simple structure, stably forming engagement claws while preventing an interference with the outer ring, and saving a manufacturing cost.

Means for Solving the Problems

The object of the present invention is accomplished by following configurations.

(1) A bearing device including:
a rolling bearing having an inner ring, an outer ring having a small-diameter step portion provided on an outer periphery of an axial end portion thereof, and a plurality of rolling elements arranged to be freely rollable between the inner ring and the outer ring, and
a retainer plate attached to the outer ring so as to be relatively rotatable and configured to fix the rolling bearing to a housing,
wherein an engagement groove extending in a circumferential direction is formed on an outer peripheral surface of the small-diameter step portion,
wherein an inner peripheral surface of the retainer plate has a step shape having a small-diameter hole portion configured to face the outer peripheral surface of the small-diameter step portion and a large-diameter hole portion having an inner diameter greater than the small-diameter hole portion and configured to face an outer peripheral surface of the outer ring,
wherein a radial gap between the outer peripheral surface of the outer ring and the large-diameter hole portion is set smaller than a radial gap between the outer peripheral surface of the small-diameter step portion positioned at a more axially outboard side than the engagement groove and the small-diameter hole portion so that the retainer plate is to be guided along the outer ring in the large-diameter hole portion, and
wherein the retainer plate has a plurality of engagement claws protruding radially inward from an inner periphery of the retainer plate defining the small-diameter hole portion and to be engaged with the engagement groove.

(2) The bearing device according to the above (1),
wherein the retainer plate has a first thickness-reduced part formed at a peripheral edge between the inner peripheral surface of the small-diameter hole portion and a side surface of the retainer plate, and
wherein the engagement claws are formed by axially pressing the inner periphery of the retainer plate, including at least the first thickness-reduced part.

(3) The bearing device according to the above (1) or (2),
wherein the outer ring has a second thickness-reduced part formed at a peripheral edge between the outer peripheral surface of the small-diameter step portion and a side surface of the engagement groove.

(4) A method for manufacturing a bearing device, the bearing device including:
a rolling bearing having an inner ring, an outer ring having a small-diameter step portion provided on an outer periphery of an axial end portion thereof, and a plurality of rolling elements arranged to be freely rollable between the inner ring and the outer ring, and
a retainer plate attached to the outer ring so as to be relatively rotatable and configured to fix the rolling bearing to a housing,
the method including:
forming a circumferentially extending engagement groove on an outer peripheral surface of the small-diameter step portion,
forming an inner peripheral surface of the retainer plate into a step shape having a small-diameter hole portion configured to face the outer peripheral surface of the small-diameter step portion and a large-diameter hole portion having an inner diameter greater than the small-diameter hole portion and configured to face an outer peripheral surface of the outer ring,
setting a radial gap between the outer peripheral surface of the outer ring and the large-diameter hole portion to be smaller than a radial gap between the outer peripheral surface of the small-diameter step portion positioned at a more axially outboard side than the engagement groove and the small-diameter hole portion, and
setting the retainer plate on the rolling bearing by guiding the large-diameter hole portion along the outer peripheral surface of the outer ring, forming engagement claws by axially pressing an inner periphery of the retainer plate defining the small-diameter hole portion and plastically deforming the inner periphery of the retainer plate so as to bulge radially inward, and engaging the engagement claws with the circumferentially extending engagement groove formed on the outer peripheral surface of the small-diameter step portion.

Effects of the Invention

According to the bearing device of the present invention, the small-diameter step portion is formed on the outer peripheral surface thereof with the circumferentially extending engagement groove, the inner peripheral surface of the retainer plate has the step shape having the small-diameter hole portion configured to face the outer peripheral surface of the small-diameter step portion and the large-diameter hole portion having an inner diameter greater than the small-diameter hole portion and configured to face the outer peripheral surface of the outer ring, the radial gap between the outer peripheral surface of the outer ring and the large-diameter hole portion is set smaller than the radial gap between the outer peripheral surface of the small-diameter step portion positioned at the more axially outboard side than the engagement groove and the small-diameter hole portion so that the retainer plate is to be guided along the outer ring in the large-diameter hole portion, and the retainer plate has the plurality of engagement claws protruding radially inward from the inner periphery of the retainer plate defining the small-diameter hole portion and configured to engage with the engagement groove. Therefore, the retainer plate is guided along the outer peripheral surface of the outer ring, for which the grinding processing has been already performed, in the large-diameter hole portion, and the engagement claws are engaged with the engagement groove, so that the retainer plate and the outer ring are mounted to be non-separable. Thereby, it is not necessary to guide the retainer plate on the outer peripheral surface of the small-diameter step portion, so that it is not necessary to perform the grinding processing on the outer peripheral surface of the small-diameter step portion, it is possible to make the radial gap between the outer peripheral surface of the small-diameter step portion and the small-diameter hole portion relatively large and it is not necessary to form concave portions for forming the engagement claws on the inner peripheral surface of the retainer plate. Therefore, it is possible to save the manufacturing costs of the outer ring and the retainer plate. Also, the small-diameter step portion preferably has a function of keeping the engagement claws not to be separable by the engagement groove, and it is possible to shorten an axial length of the small-diameter step portion, thereby improving strength of the outer ring.

Also, according to the method for manufacturing the bearing device of the present invention, the radial gap between the outer peripheral surface of the outer ring and the large-diameter hole portion is set smaller than the radial gap between the outer peripheral surface of the small-diameter step portion positioned at the more axially outboard side than the engagement groove and the small-diameter hole portion. After the retainer plate is set on the rolling bearing by guiding the large-diameter hole portion along the outer peripheral surface of the outer ring, the engagement claws are formed by axially pressing the inner periphery of the retainer plate defining the small-diameter hole portion and plastically deforming the inner periphery of the retainer plate so as to bulge radially inward, and the engagement claws are engaged with the circumferentially extending engagement groove formed on the outer peripheral surface of the small-diameter step portion. Thereby, it is not necessary to guide the retainer plate on the outer peripheral surface of the small-diameter step portion and to perform the grinding processing on the outer peripheral surface of the small-diameter step portion, it is possible to make the radial gap between the outer peripheral surface of the small-diameter step portion and the small-diameter hole portion relatively large, and it is not necessary to form concave portions for forming the engagement claws on the inner peripheral surface of the retainer plate. Therefore, it is possible to save the manufacturing costs of the outer ring and the retainer plate. Also, the small-diameter step portion preferably has a function of keeping the engagement claws not to be separable by the engagement groove, and it is possible to shorten the axial length of the small-diameter step portion, thereby improving strength of the outer ring.

DETAILED DESCRIPTION

Hereinafter, a bearing device in accordance with an embodiment of the present invention will be described in detail with reference to the drawings.

Figure 1A:
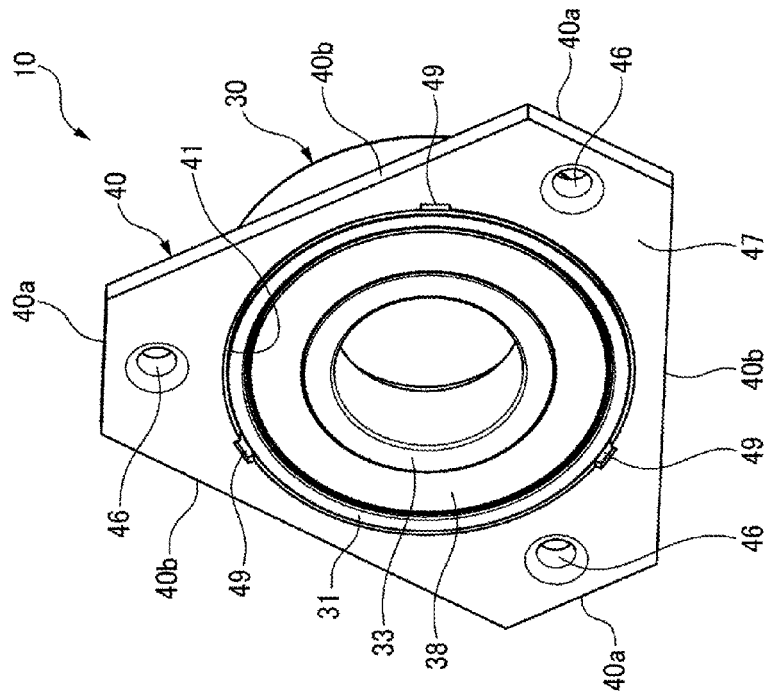
FIG. 1A is a perspective view depicting a bearing device in accordance with an embodiment of the present invention, as seen from a surface-side.
Figure 1B:
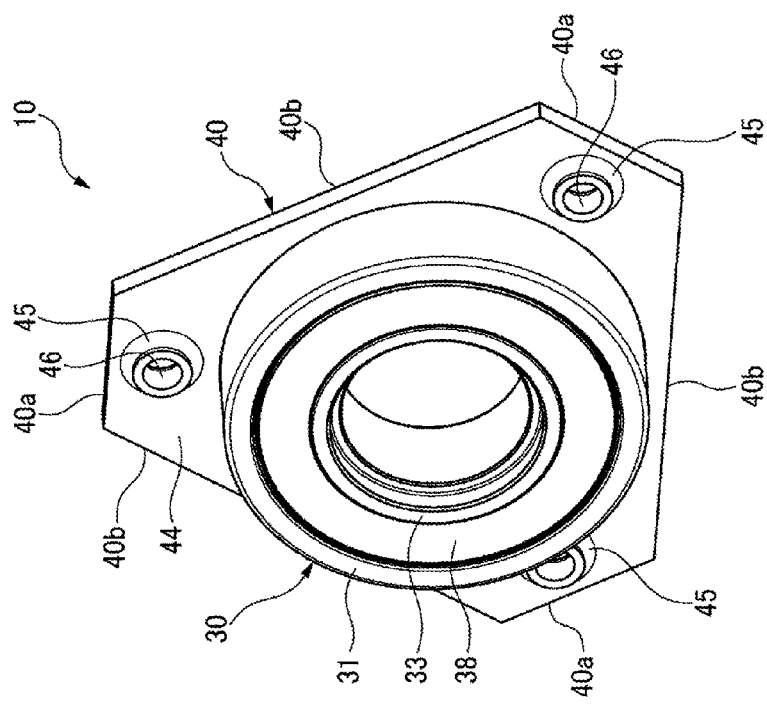
FIG. 1B is a perspective view of the bearing device, as seen from a backside.
Figure 2:
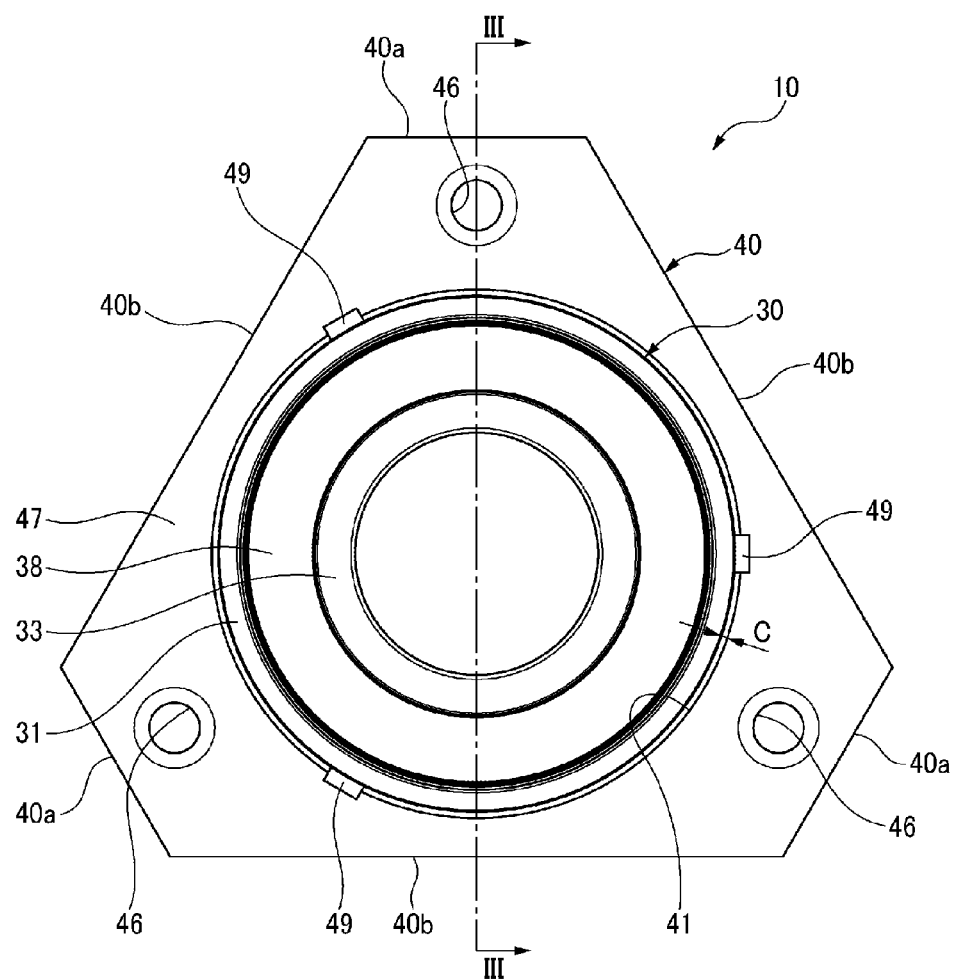
FIG. 2 is a plan view of the bearing device shown in FIG. 1, as seen from a backside.
Figure 3A:
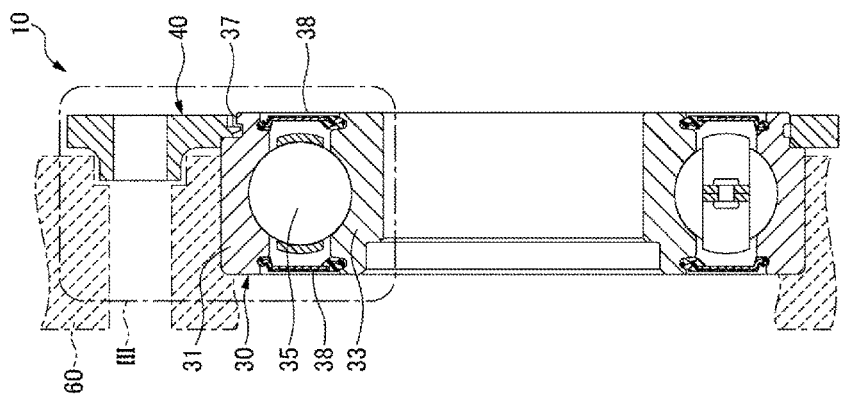
FIG. 3A is a sectional view taken along a line of FIG. 2.
Figure 3B:
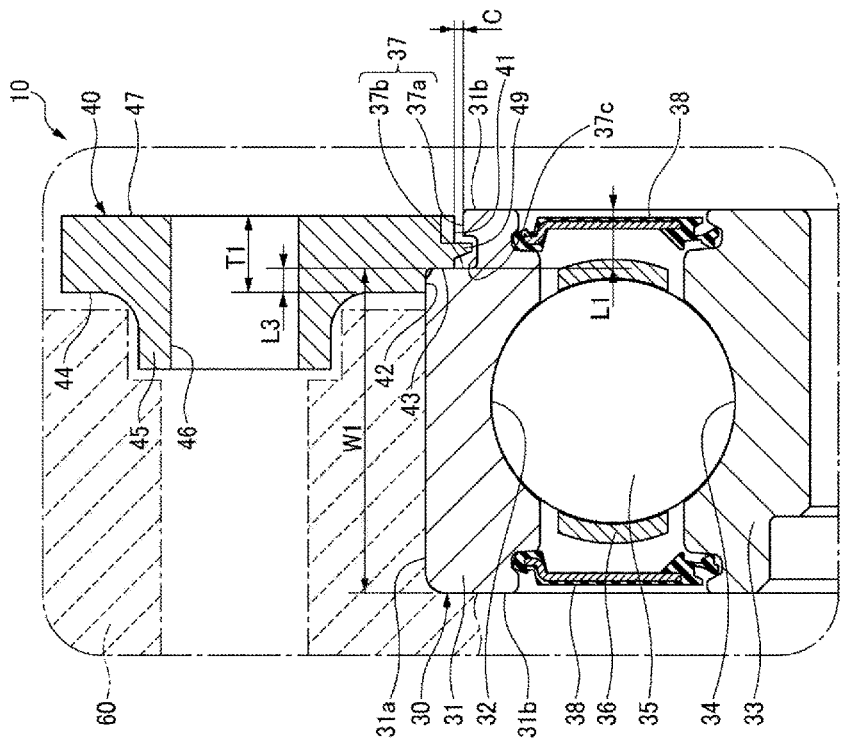
FIG. 3B is an enlarged view of a III part of FIG. 3A.

As shown in FIGS. 1 to 3, a bearing device 10 includes a radial rolling bearing 30 and a retainer plate 40 mounted to the radial rolling bearing 30 so as to be relatively rotatable and to be non-separable. The retainer plate 40 is configured to fix the radial rolling bearing 30 to a housing 60 (refer to FIG. 3).

Figure 4:
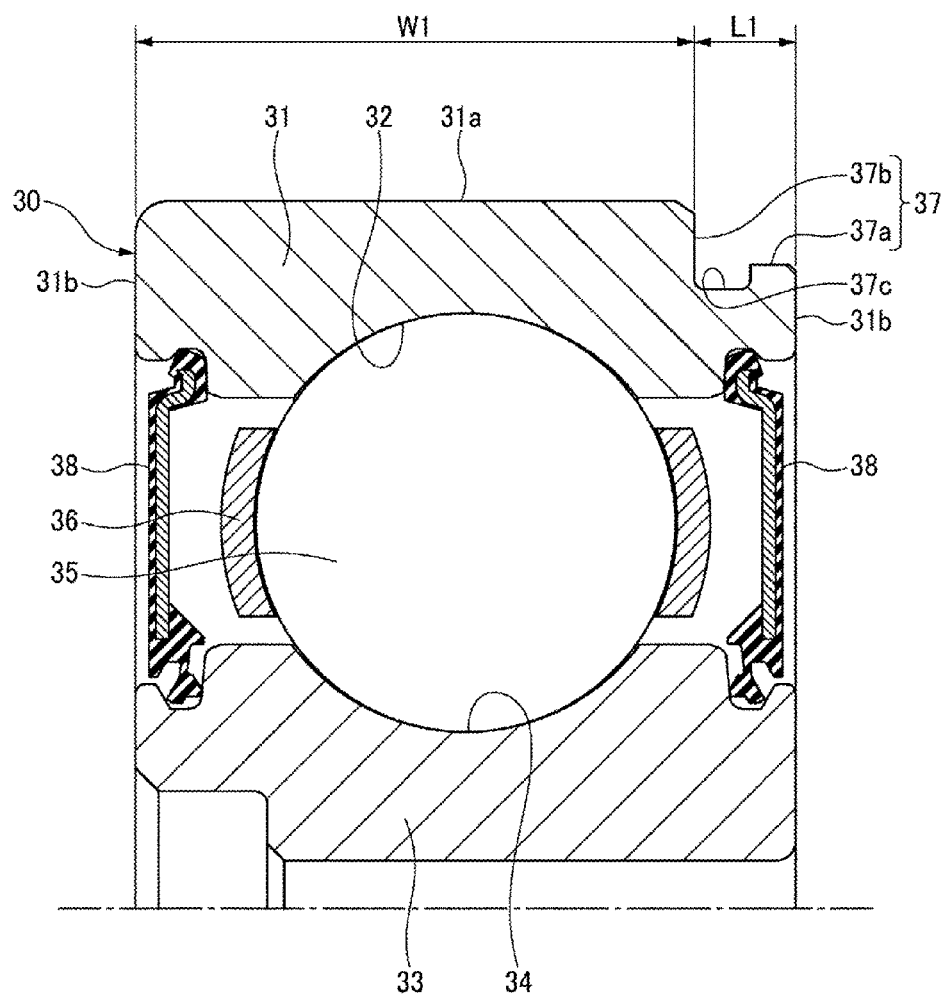
FIG. 4 is a sectional view of main parts of a radial rolling bearing shown in FIG. 3.

As shown in FIGS. 3 and 4, the radial rolling bearing 30 has an outer ring 31 having an outer ring raceway 32 formed on an inner peripheral surface thereof, an inner ring 33 having an inner ring raceway 34 formed on an outer peripheral surface thereof, and balls 35 which are a plurality of rolling elements kept at a retainer 36 and arranged to be freely rollable between the outer ring raceway 32 and the inner ring raceway 34. Also, seal members 38 are arranged at both axial end portions of the outer ring 31 between the outer ring 31 and the inner ring 33. The seal members 38 are provided to seal the radial rolling bearing 30.

An outer periphery of one axial end portion of the outer ring 31 is formed with a small-diameter step portion 37 having a step portion outer peripheral surface 37a of which a diameter is smaller than an outer diameter of the outer ring 31 and a step surface 37b extending radially outward from the step portion outer peripheral surface 37a. The step portion outer peripheral surface 37a is formed with an engagement groove 37c along an entire circumference. Meanwhile, in the shown embodiment, an axially inboard side wall of the engagement groove 37c is formed continuously to the step surface 37b. However, the engagement groove 37c may also be formed at an axially intermediate part of the step portion outer peripheral surface 37a. In this case, the axially inboard side wall of the engagement groove 37c is formed at a position different from the step surface 37b.

As shown in FIGS. 1 to 3, the retainer plate 40 is a substantially hexagonal plate member of which short sides 40a and long sides 40b are alternately arranged in a circumferential direction, and is formed at its center with a small-diameter hole portion 41 configured to face the step portion outer peripheral surface 37a of the small-diameter step portion 37 of the outer ring 31 and a large-diameter hole portion 42 adjacent to the small-diameter hole portion 41, having an inner diameter greater than the small-diameter hole portion 41 and configured to face an outer peripheral surface 31a of the outer ring 31. The large-diameter hole portion 42 is a hole formed from a surface 44-side of the retainer plate 40 and having a depth L3. A step surface 43 extending radially is formed between the small-diameter hole portion 41 and the large-diameter hole portion 42.

Thereby, as described later, when the large-diameter hole portion 42 of the retainer plate 40 is fitted to the outer peripheral surface 31a of the outer ring 31 with a predetermined radial gap (guide gap: $(\phi4-\phi3)/2$), a radial gap C ($=(\phi2-\phi1)/2$) is formed over an entire circumference between an inner peripheral surface of the small-diameter hole portion 41 and the step portion outer peripheral surface 37a of the small-diameter step portion 37.

Also, boss parts 45 each of which protrudes toward the surface 44-side of the retainer plate 40 are respectively formed at three places corresponding to the short sides 40a and equidistantly spaced in the circumferential direction. The boss part 45 is formed with an attachment hole 46 into which a fastening screw (not shown) for fixing the bearing device 10 to the housing is to be screwed or inserted.

Figure 11A:
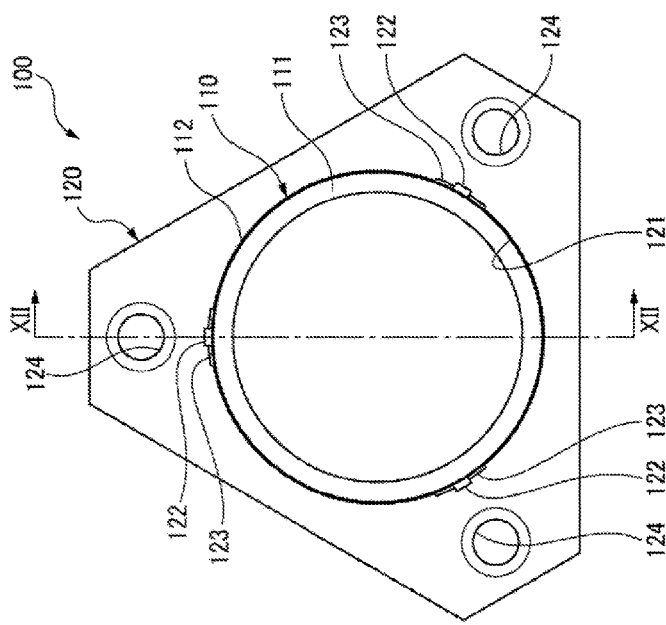
FIG. 11A is a perspective view depicting a bearing device of the related art, as seen from a surface-side.
Figure 11B:
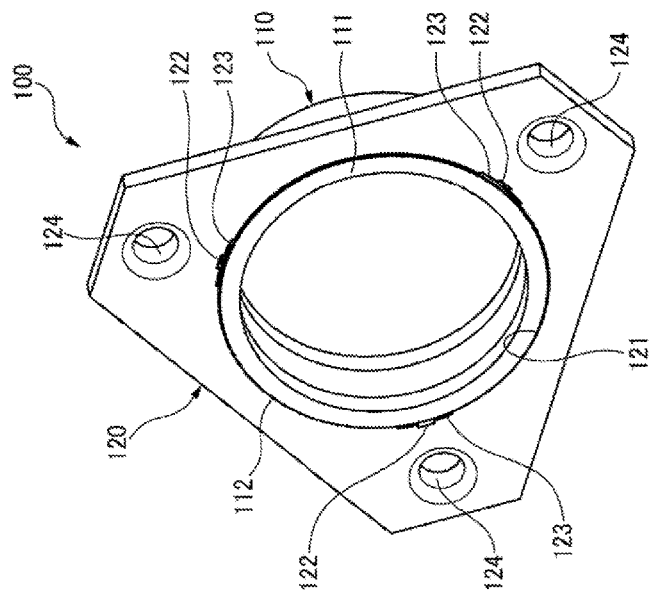
FIG. 11B is a perspective view of the bearing device, as seen from a backside.

The retainer plate 40 is manufactured by press working of forming the large-diameter hole portion 42 from the surface 44-side of the retainer plate 40 and then punching the small-diameter hole portion 41. Also, the retainer plate may be manufactured by a cutting process, not the press working. In the meantime, since the small-diameter hole portion 41 is a single circle, it is possible to easily manufacture a press mold and to easily form the small-diameter hole portion 41, as compared to the retainer plate 120 (refer to FIG. 11) of the related art.

Also, a peripheral edge between the inner peripheral surface of the small-diameter hole portion 41 and a backside 47 of the retainer plate 40 is formed at three places with engagement claws 49 protruding radially inward from an inner periphery of the small-diameter hole portion 41 and configured to engage with the engagement groove 37c of the outer ring 31 through crushing processing, which will be described later. The engagement claws 49 are formed so that the outer ring 31 and the retainer plate 40 can relatively rotate without interfering with the step portion outer peripheral surface 37a and the engagement groove 37c of the outer ring 31.

Figure 5:
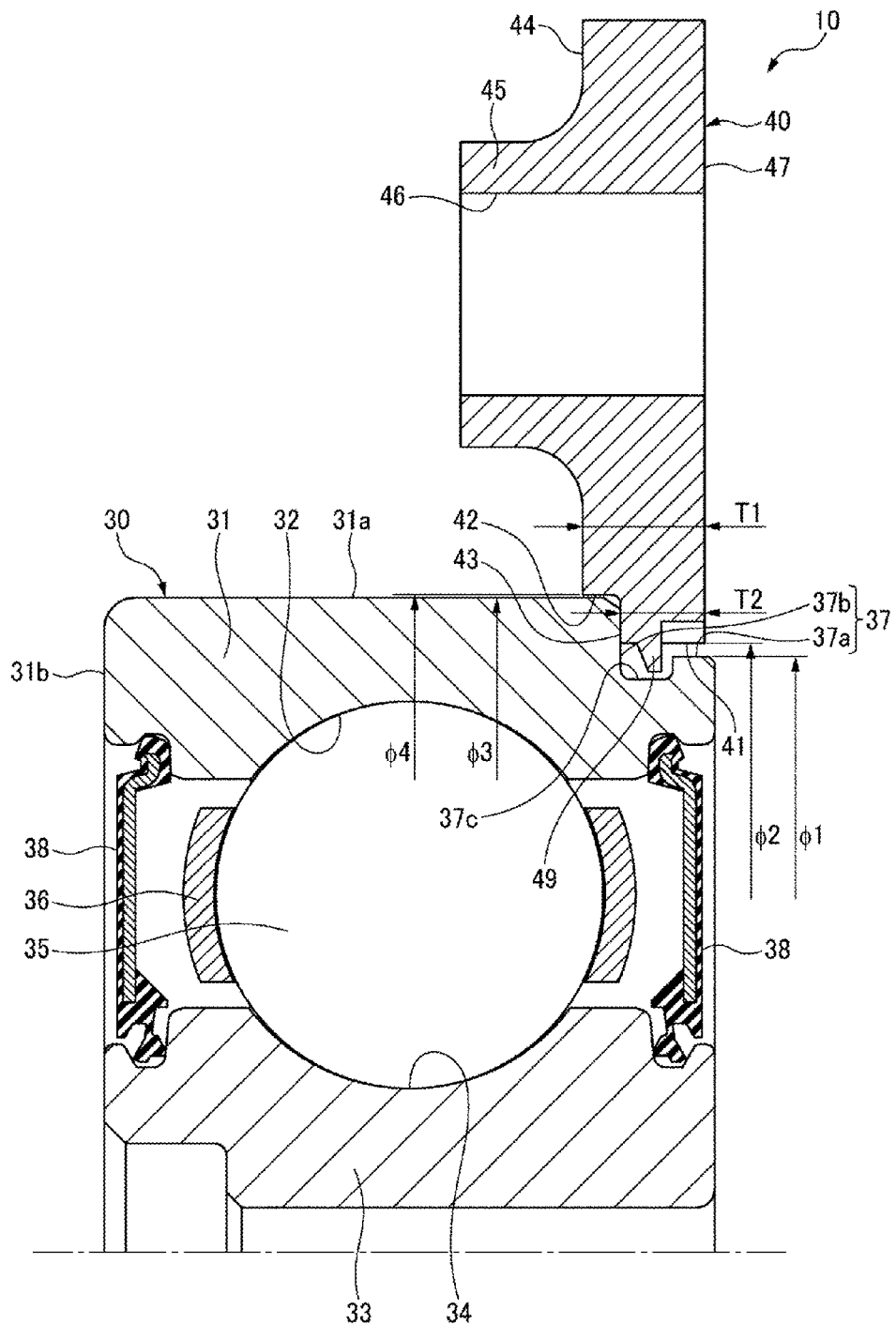
FIG. 5 is a sectional view for illustrating size conditions of a small-diameter step portion, a small-diameter hole portion, a large-diameter hole portion, and a retainer plate necessary for mounting.

Herein, according to the bearing device 10 of the embodiment, as shown in FIG. 5, when an outer diameter of the step portion outer peripheral surface 37a of the small-diameter step portion 37 is referred to as $\phi1$, an inner diameter of the small-diameter hole portion 41 is referred to as $\phi2$, an outer diameter of the outer ring 31 is referred to as $\phi3$, an inner diameter of the large-diameter hole portion 42 is referred to as $\phi4$, a plate thickness of the retainer plate 40 is referred to as T1 and a plate thickness of the small-diameter hole portion 41 is referred to as T2, the outer ring 31 and the retainer plate 40 satisfy relations of T1>T2 (preferably, $2\times T2 \geq T1 > T2$), $\phi4 > \phi3 > \phi2 > \phi1$ and $0 < \phi4-\phi3 < \phi2-\phi1$.

That is, a radial gap C ($=(\phi2-\phi1)/2$) provided between the inner peripheral surface of the small-diameter hole portion 41 and the step portion outer peripheral surface 37a of the small-diameter step portion 37 is greater than a guide gap ($=(\phi4-\phi3)/2$) between the large-diameter hole portion 42 of the retainer plate 40 and the outer peripheral surface 31a of the outer ring 31. Therefore, as described later, when forming the engagement claws 49 by axially pressing the inner periphery of the small-diameter hole portion 41 of the retainer plate 40 and plastically deforming the same, the interference between the engagement claws 49 and the step portion outer peripheral surface 37a of the small-diameter step portion 37 is effectively prevented.

Also, since the outer peripheral surface 31a and both axial side surfaces 31b of the outer ring 31 become surfaces to which the housing 60 is to be fitted or contacted, they are usually subjected to grinding processing and are thus finished with high precision. Meanwhile, in the embodiment, since the step portion outer peripheral surface 37a, the step surface 37b and the engagement groove 37c of the small-diameter step portion 37 do not require the high precision, they are configured as cutting surfaces by usual turning processing and are not subjected to further polishing processing.

A process of mounting the bearing device 10 is described with reference to FIG. 6.

Figure 6A:
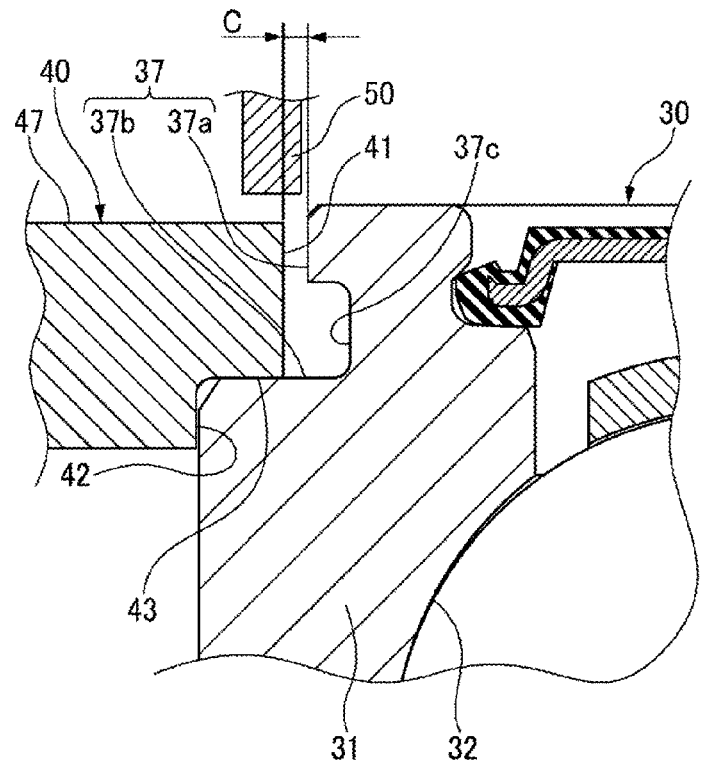
FIGS. 6(A) to 6(B) are partially sectional views depicting a process of mounting an outer ring and a retainer plate of the bearing device shown in FIG. 1.

As shown in FIG. 6A, the small-diameter step portion 37 of the outer ring 31 is first inserted into the small-diameter hole portion 41 of the retainer plate 40, the outer peripheral surface 31a of the outer ring 31 is fitted to the large-diameter hole portion 42 of the retainer plate 40 with a predetermined guide gap, and the step surface 43 of the large-diameter hole portion 42 and the step surface 37b of the small-diameter step portion 37 are contacted to set the retainer plate 40 on the rolling bearing 30.

Subsequently, a peripheral edge portion of the backside 47-side of the small-diameter hole portion 41 is axially (a downward direction in FIG. 6) pressed by a punch 50 of a press apparatus. Thereby, the punch 50 is contacted to the backside 47 of the retainer plate 40, so that the crushing processing starts and the peripheral edge portion of the small-diameter hole portion 41 is plastically deformed so as to bulge radially inward. As a result, the engagement claws 49 are formed radially inward.

Figure 6B:
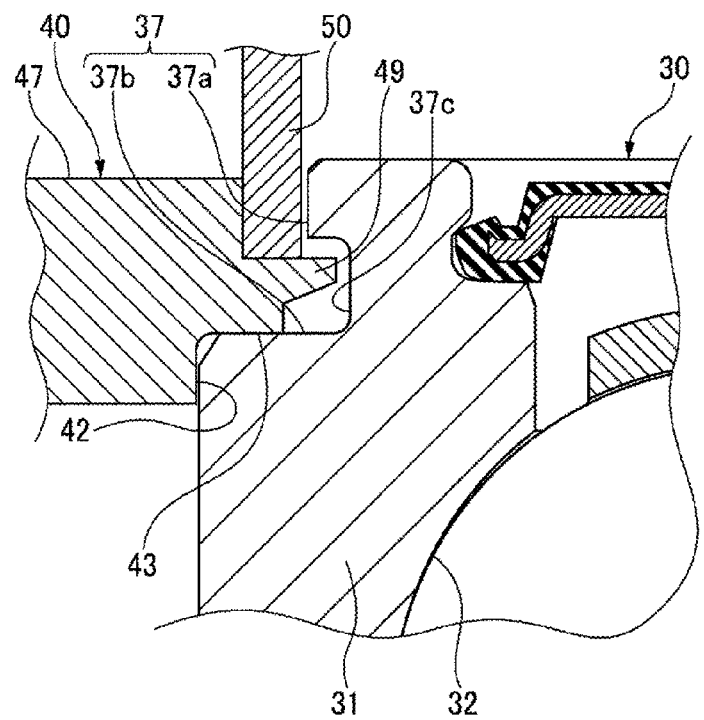

During the formation of the engagement claws 49, since the radial gap C is provided between the inner peripheral surface of the small-diameter hole portion 41 and the step portion outer peripheral surface 37a of the small-diameter step portion 37, gaps are kept between tips of the engagement claws 49 being formed and the step portion outer peripheral surface 37a, so that interference between the engagement claws 49 and the step portion outer peripheral surface 37a is prevented. As shown in FIG. 6B, when the punch 50 is lowered to a predetermined position and the crushing processing is thus over, the engagement claws 49 are formed at the axially intermediate position of the engagement groove 37c with being engaged with an interval between the engagement claws and a bottom of the engagement groove 37c.

Thereby, the engagement claws 49 are engaged with the engagement groove 37c formed on the step portion outer peripheral surface 37a, and the radial rolling bearing 30 and the retainer plate 40 are mounted to be non-separable and to be relatively rotatable.

In the bearing device 10 of the embodiment, the large-diameter hole portion 42 of the retainer plate 40 is fitted to the outer peripheral surface 31a of the outer ring 31, which has been grinded and finished with high precision, with the predetermined guide gap, so that the retainer plate 40 is positioned on the basis of the outer peripheral surface 31a of the outer ring 31. Thereby, as compared to the bearing device 100 of the related art where since the fitting hole 121 of the retainer plate 120 is fitted to the small-diameter step portion 112 of the outer ring 111, the outer peripheral surface 112a of the small-diameter step portion 112 is necessarily subjected to the further processing such as grinding processing, it is possible to position the retainer plate 40 with high precision without performing the special processing for the outer ring 31. Also, since the radial gap C is provided between the small-diameter hole portion 41 of the retainer plate 40 and the step portion outer peripheral surface 37a of the outer ring 31 and the step portion outer peripheral surface 37a does not configure a guide surface, the high size precision is not required for the step portion outer peripheral surface 37a and the cutting surfaces formed by the turning processing of low processing cost are used as they are.

Also, since the engagement claws 49 are formed at the retainer plate 40 positioned with respect to the outer ring 31 with high precision, an unevenness of shapes (lengths) of the engagement claws 49 is suppressed. Therefore, it is not necessary to deepen the depth of the engagement groove 37c to be engaged with the engagement claws 49, so that a possibility of quenching cracks of a thickness-reduced part due to a heat treatment is reduced.

In this way, since the position precision of the retainer plate 40 is secured by the outer peripheral surface 31a of the outer ring 31 and the non-separable function between the outer ring 31 and the retainer plate 40 is provided by the engagement between the engagement groove 37c and the engagement claws 49, it is possible to suppress the unevenness of the engagement claws 49 and to satisfy the functions required for the engagement claws 49 while saving the cost.

When transporting the bearing device 10 or when mounting the bearing device 10 to the housing, the retainer plate 40 and the bearing 30 are necessarily required to relatively rotate without separating from each other. Therefore, the engagement claws 49 are formed with gaps between the engagement claws and the engagement groove 37c of the small-diameter step portion 37. In the meantime, at a state where the retainer plate 40 is fastened and fixed to the housing 60 by screws and the bearing 30 is thus fitted and fixed to the housing 60, the retainer plate 40 is applied with an axial load, so that the retainer plate 40 is slightly deformed. The engagement claws 49 are formed to have a shape and to be positioned so that they do not interfere with the groove bottom and both sidewalls of the engagement groove 37c even at this state. By this configuration, the engagement claws 49 can secure the strength enough to endure the inertia force of the bearing 30 upon the transportation and upon the mounting, so that it is possible to make the engagement claws 49 small, to enlarge the application range of the bearing device 10 and to reduce the press load (to save the assembling cost).

Figure 12A:
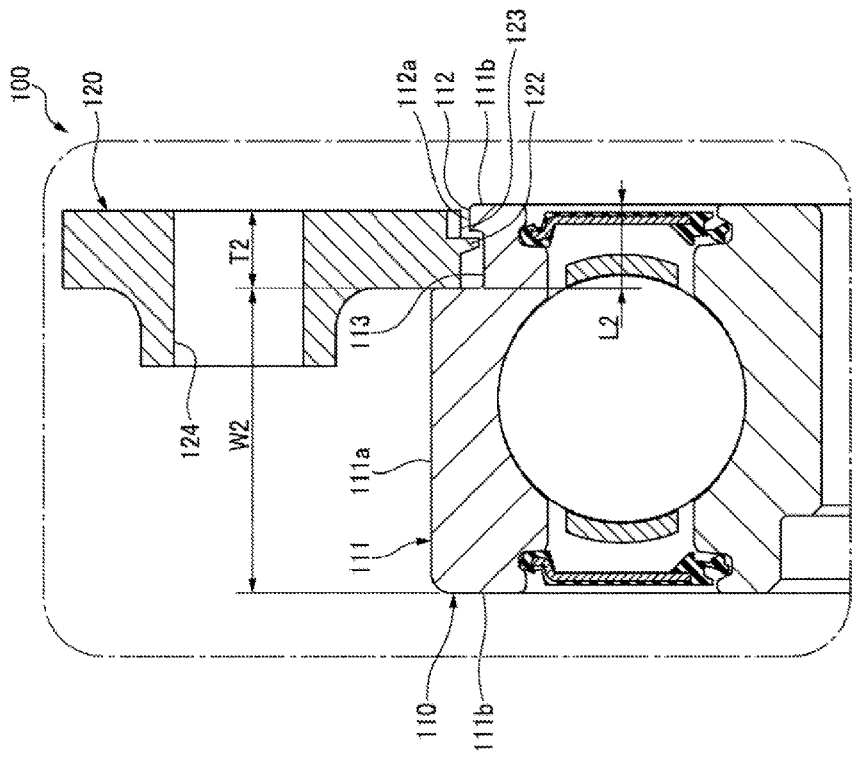
FIG. 12A is a sectional view taken along a line XII-XII of FIG. 11B.
Figure 12B:
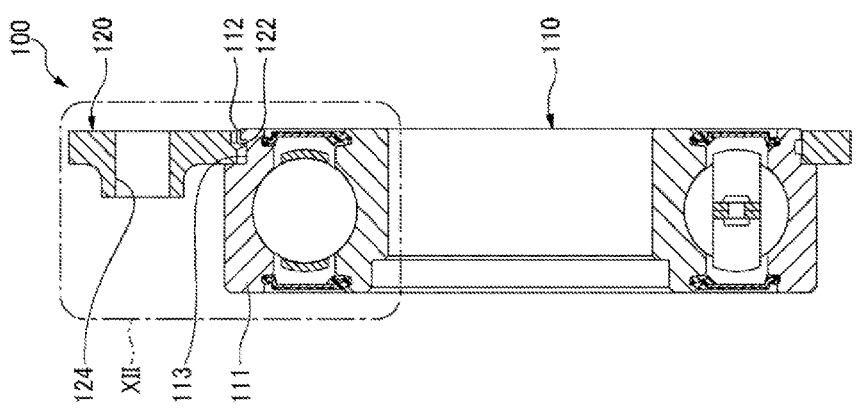
FIG. 12B is an enlarged view of an XII part of FIG. 12A.

Also, the retainer plate 40 is positioned as the large-diameter hole portion 42 is fitted to the outer peripheral surface 31a of the outer ring 31 with the predetermined guide gap. Therefore, as shown in FIGS. 3 and 12, as compared to an axial length W2 of the outer peripheral surface 111a of the outer ring 111 of the bearing device 100 of the related art, it is possible to make the axial length W1 of the outer peripheral surface 31a of the outer ring 31 of the embodiment longer (W1>W2) by the axial length L3 of the large-diameter hole portion 42. Thereby, the stiffness of the outer ring 31 is improved, so that it is possible to suppress deformation of the outer ring raceway 32 due to a bolt shaft force, which is to be applied when fixing the retainer plate 40.

In addition, an axial length (W1−L3) between the left side surface 31b of the outer ring 31 and the surface 44 of the retainer plate 40 is the same as the axial length W2 of the outer peripheral surface 111a of the bearing device 100 of the related art. Therefore, it is possible to apply a shape of the housing of the related art, as it is, without changing the shape of the housing.

As described above, according to the bearing device 10 of the embodiment, the small-diameter step portion 37 is formed on the step portion outer peripheral surface 37a with the circumferentially extending engagement groove 37c, and the inner peripheral surface of the retainer plate 40 is formed to have a step shape having the small-diameter hole portion 41 configured to face the step portion outer peripheral surface 37a of the small-diameter step portion 37 and the large-diameter hole portion 42 having the inner diameter greater than the small-diameter hole portion 41 and configured to face the outer peripheral surface 31a of the outer ring 31 and to guide the rolling bearing 30. The radial gap between the outer peripheral surface 31a of the outer ring 31 and the large-diameter hole portion 42 is set smaller than the radial gap C between the step portion outer peripheral surface 37a of the small-diameter step portion 37 positioned at the more axially outboard side than the engagement groove 37c and the small-diameter hole portion 41 so that the retainer plate 40 is to be guided along the outer ring 31 in the large-diameter hole portion 42. The retainer plate 40 has the plurality of engagement claws 49 protruding radially inward from the inner periphery of the retainer plate 40 defining the small-diameter hole portion 41 and configured to engage with the engagement groove 37c. Therefore, the retainer plate 40 is guided in the large-diameter hole portion 42 along the outer peripheral surface 31a of the outer ring 31, for which the grinding processing has been already performed, and the engagement claws 49 are engaged with the engagement groove 37c, so that the retainer plate 40 and the outer ring 31 are mounted to be non-separable. Thereby, it is not necessary to guide the retainer plate 40 on the step portion outer peripheral surface 37a of the small-diameter step portion 37 and to perform the further processing of high precision such as grinding processing for the step portion outer peripheral surface 37a of the small-diameter step portion 37. Also, it is possible to make the radial gap C between the outer peripheral surface 37a of the small-diameter step portion 37 and the small-diameter hole portion 41 relatively large, and it is not necessary to form the concave portions 123 for forming the engagement claws 49 on the inner peripheral surface of the retainer plate 40, unlike the related art. Therefore, it is possible to save the manufacturing costs of the outer ring 31 and the retainer plate 40. Also, the small-diameter step portion 37 is preferably configured to simply exhibit the function of not separating the engagement claws 49 by the engagement groove 37c, and the axial length L1 of the small-diameter step portion 37 can be shortened to improve the strength of the outer ring 31.

Also, according to the method for manufacturing the bearing device of the present invention, the radial gap between the outer peripheral surface of the outer ring 31 and the large-diameter hole portion 42 is set smaller than the radial gap C between the step portion outer peripheral surface 37a of the small-diameter step portion 37 positioned at the more axially outboard side than the engagement groove 37c and the small-diameter hole portion 41, and the inner peripheral surface of the retainer plate 40 is formed to have a step shape having the small-diameter hole portion 41 configured to face the step portion outer peripheral surface 37a of the small-diameter step portion 37 and the large-diameter hole portion 42 having the inner diameter greater than the small-diameter hole portion 41 and configured to face the outer peripheral surface 31a of the outer ring 31 and to guide the rolling bearing 30. After the retainer plate 40 is set on the rolling bearing 30 by guiding the large-diameter hole portion 42 along the outer peripheral surface 31a of the outer ring 31, and the engagement claws 49 are formed by axially pressing the inner periphery of the retainer plate 40 defining the small-diameter hole portion 41 and plastically deforming the inner periphery of the retainer plate 40 so as to bulge radially inward and are then engaged with the circumferentially extending engagement groove 37c formed on the step portion outer peripheral surface 37a of the small-diameter step portion 37. Thereby, it is not necessary to guide the retainer plate 40 on the step portion outer peripheral surface 37a of the small-diameter step portion 37 and to perform the grinding processing for the step portion outer peripheral surface 37a of the small-diameter step portion 37. Also, it is possible to make the radial gap C between the outer peripheral surface 37a of the small-diameter step portion 37 and the small-diameter hole portion 41 relatively large, and it is not necessary to form the concave portions 123 for forming the engagement claws 49 on the inner peripheral surface of the retainer plate 40, unlike the related art. Therefore, it is possible to save the manufacturing costs of the outer ring 31 and the retainer plate 40. Also, the small-diameter step portion 37 is preferably configured to simply exhibit the function of not separating the engagement claws 49 by the engagement groove 37c, and the axial length of the small-diameter step portion 37 can be shortened to improve the strength of the outer ring 31.

Figure 7A:
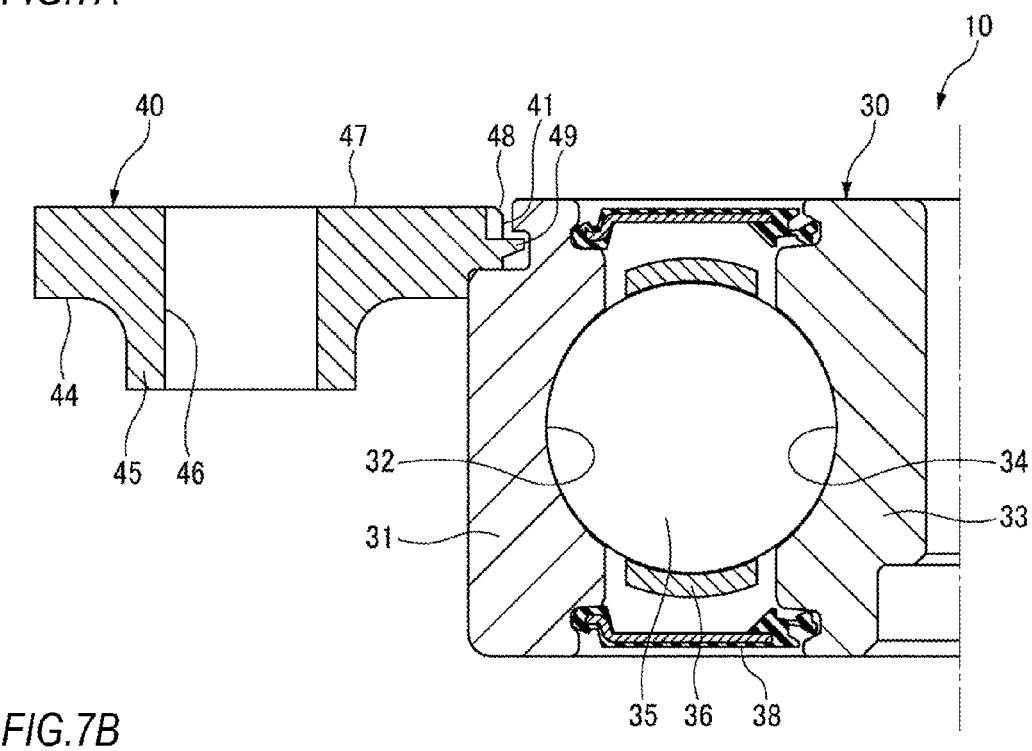
FIG. 7A is a partially sectional view of a bearing device in accordance with a first modified embodiment of the embodiment.
Figure 7B:
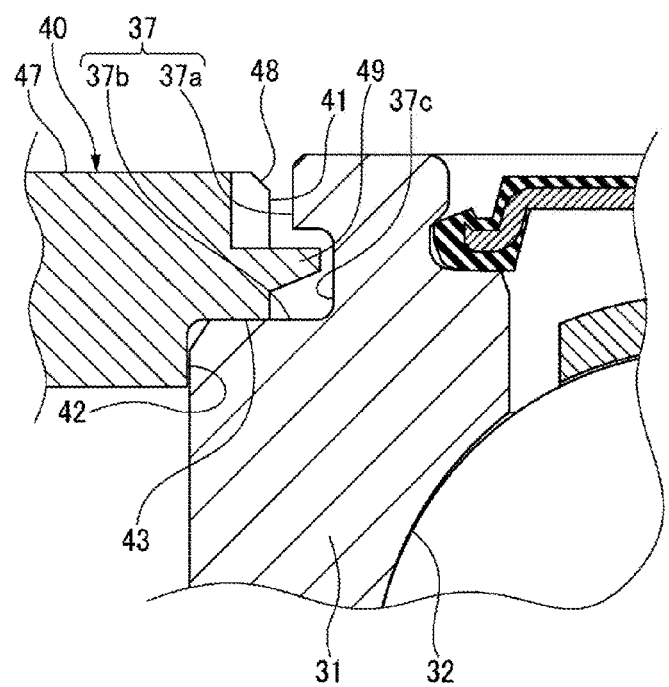
FIG. 7B is an enlarged view of main parts of FIG. 7A.

In the meantime, like a first modified embodiment of FIG. 7, a tapered portion 48 serving as a first thickness-reduced part may be formed in advance at the periphery between the inner peripheral surface of the small-diameter hole portion 41 of the retainer plate 40 and the backside 47. When the tapered portion 48 is formed in advance at the retainer plate 40, it is possible to securely prevent the interference between the engagement claws 49 and the step portion outer peripheral surface 37a during the formation of the engagement claws 49, so that it is possible to stably form the engagement claws 49.

Figure 8:
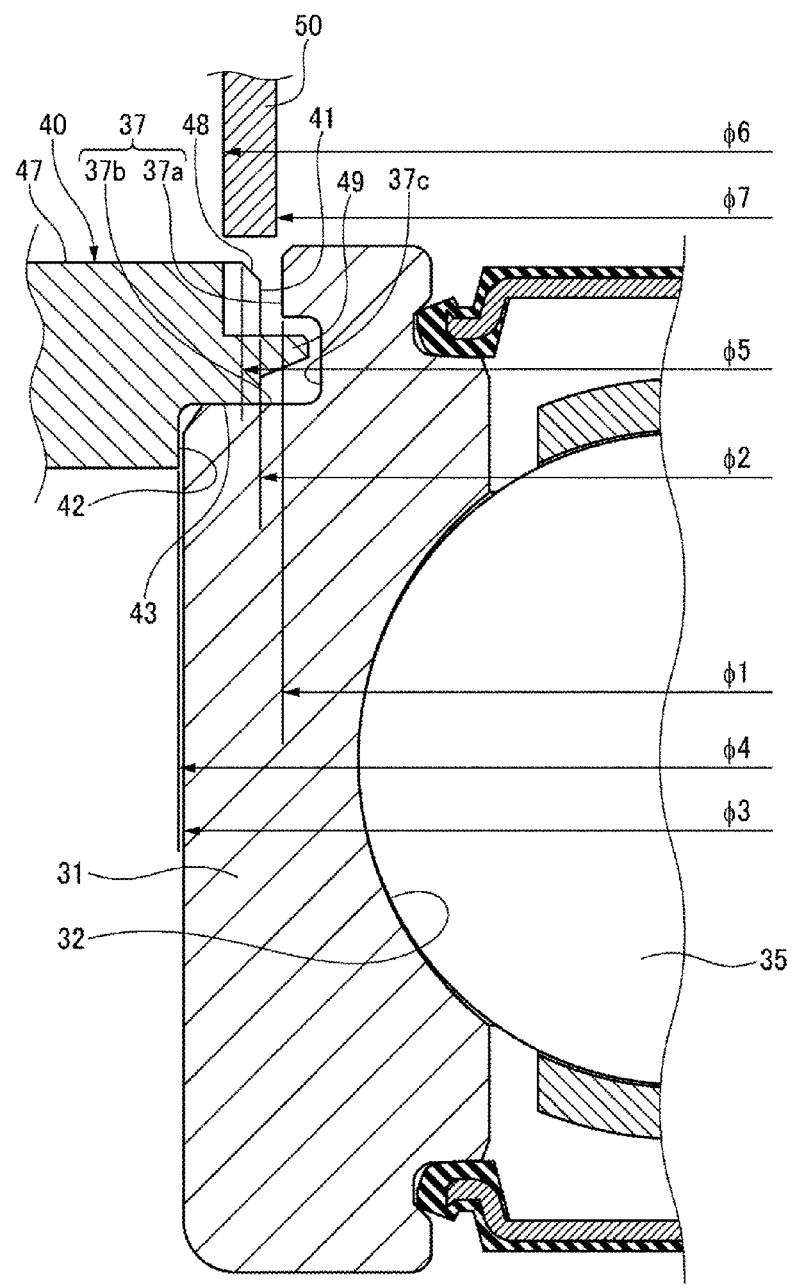
FIG. 8 is a sectional view for illustrating size conditions of a small-diameter step portion, a tapered portion, a small-diameter hole portion, a large-diameter hole portion, and a punch necessary for mounting of the bearing device shown in FIG. 7.

FIG. 8 depicts shape conditions of the radial rolling bearing 30 and the retainer plate 40 for forming the engagement claws 49 without the interference with the outer ring 31, in the bearing device 10 of the first modified embodiment. That is, as shown in FIG. 8, when an outer diameter of the small-diameter step portion 37 is referred to as $\phi 1$, an inner diameter of the small-diameter hole portion 41 is referred to as $\phi 2$, an outer diameter of the outer ring 31 is referred to as $\phi 3$, an inner diameter of the large-diameter hole portion 42 is referred to as $\phi 4$, an outer diameter of the tapered portion 48 is referred to as $\phi 5$, an outer diameter of the punch 50 is referred to as $\phi 6$, and an inner diameter of the punch 50 is referred to as $\phi 7$, relations of $\phi 2 \geq \phi 7 > \phi 1$, $\phi 3 > \phi 7$ and $\phi 3 > \phi 2$ are satisfied. Also, a condition of $\phi 3 \geq \phi 6 \geq \phi 5$ is preferably satisfied.

In the meantime, shapes such as an angle, an axial length and the like of the tapered portion 48 are arbitrarily set in accordance with the thickness of the retainer plate 40, and the like When mounting the retainer plate 40 satisfying the above conditions to the outer ring 31, the engagement claws 49 are formed by axially pressing the inner periphery of the retainer plate 40, including a part of the tapered portion 48 and the backside 47, and plastically deforming the inner periphery of the retainer plate 40 so as to bulge radially inward. Thereby, protruding heights and formation positions of the engagement claws 49 become stable and the engagement claws 49 and the engagement groove 37c are securely engaged with each other, so that it is possible to attach the retainer plate 40 onto the bearing 30. Also, the tip portion of the engagement claw 49 may be formed into a shape having no angled portion, and local damage or missing of the tip portion due to the contact with the outer ring 31 during the formation of the engagement claws 49 or after forming the engagement claws can be suppressed.

Figure 9A:
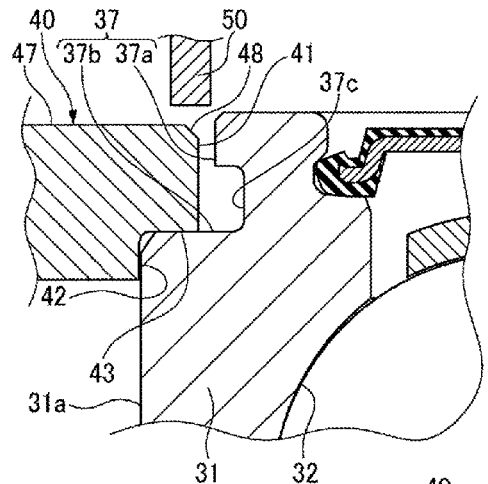
FIGS. 9(A) to 9(C) are partially sectional views depicting a process of mounting an outer ring and a retainer plate of the bearing device shown in FIG. 7.

Specifically, as shown in FIG. 9A, after setting the retainer plate 40 on the rolling bearing 30 by fitting the large-diameter hole portion 42 of the retainer plate 40 to the outer peripheral surface 31a of the outer ring 31 with the predetermined guide gap and bringing the step surface 43 of the large-diameter hole portion 42 into contact with the step surface 37b of the small-diameter step portion 37, the punch 50 of the press apparatus is arranged to extend over both the tapered portion 48 of the small-diameter hole portion 41 and the backside 47 of the retainer plate 40 and is pressed axially (downward in FIG. 9). Thereby, the punch 50 is first contacted to the backside 47 of the retainer plate 40, so that the crushing processing starts. Subsequently, the tapered portion 48 is crushed and plastically deformed, so that the engagement claws 49 protrude radially inward, i.e., towards the step portion outer peripheral surface 37a.

Figure 9B:
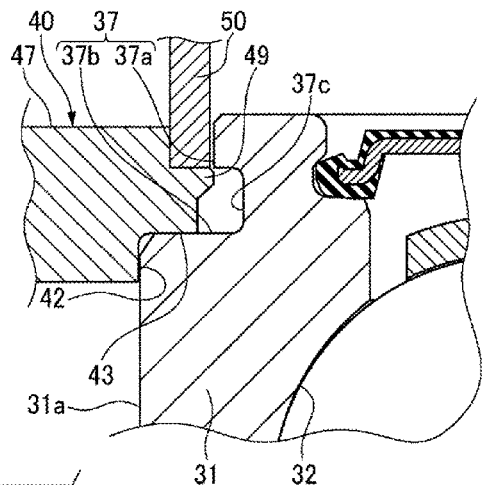

As shown in FIG. 9B, even when the crushing processing by the punch 50 is further performed and the punch 50 reaches a lower end portion of the tapered portion 48, a part of the shape of the tapered portion 48 remains at the tip portion of the engagement claw 49 and a gap is kept between the engagement claw and the step portion outer peripheral surface 37a, so that the engagement claw 49 does not interfere with the step portion outer peripheral surface 37a.

Figure 9C:
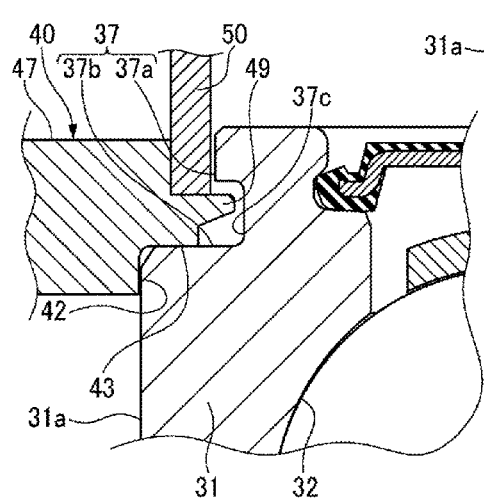

Then, as shown in FIG. 9C, when the punch 50 is lowered to a predetermined position and the crushing processing is thus over, the engagement claws 49 are formed at the axially intermediate position of the engagement groove 37c with gaps from the bottom of the engagement groove 37c.

In the meantime, the tapered portion 48 shown in FIG. 7 may be configured by a convex curved surface part or a concave curved surface part.

As described above, according to the bearing device 10 of the first modified embodiment, the retainer plate 40 has the tapered portion 48 formed at the peripheral edge between the inner peripheral surface of the small-diameter hole portion 41 and the backside 47 of the retainer plate 40, and the engagement claws 49 are formed by axially pressing the inner periphery of the retainer plate 40, including at least the tapered portion 48. Therefore, it is possible to stably form the engagement claws 49 while preventing the interference with the outer ring 31, so that it is possible to improve the productivity of the bearing device 10.

Figure 10A:
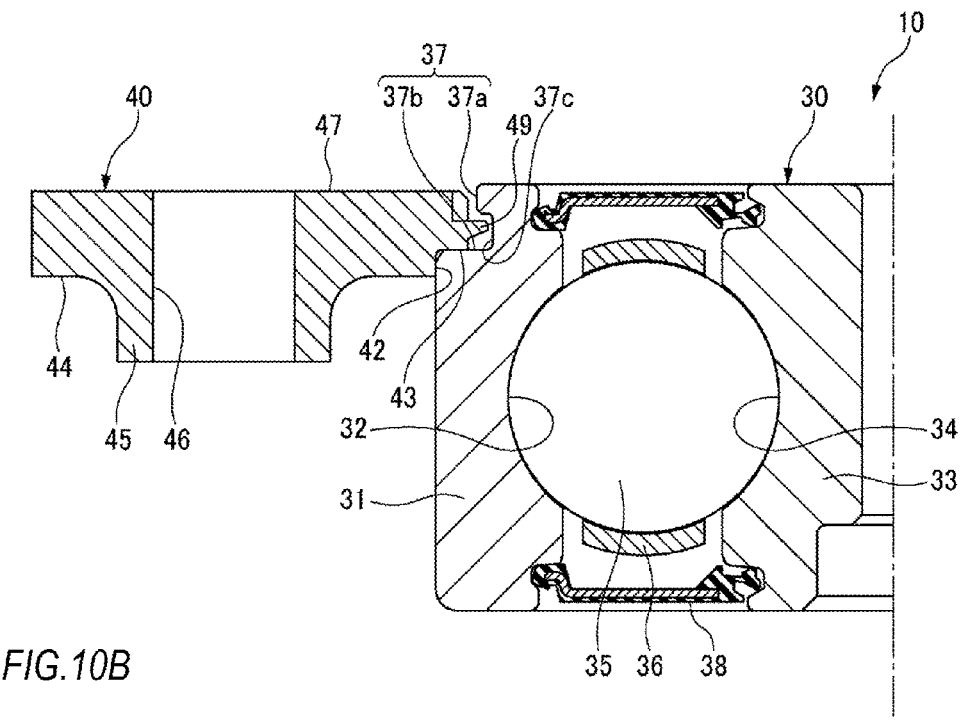
FIG. 10A is a partially sectional view of a bearing device in accordance with a second modified embodiment of the embodiment.
Figure 10B:
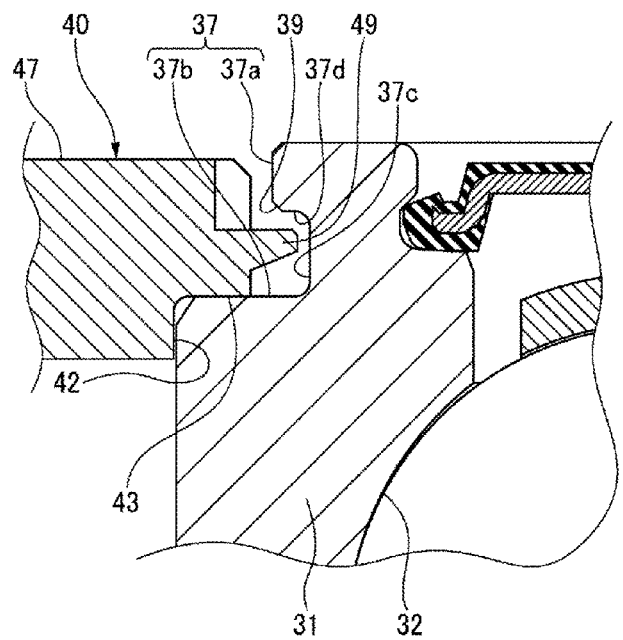
FIG. 10B is an enlarged view of main parts of FIG. 7A.

Also, the engagement groove 37c of the small-diameter step portion 37 may have a tapered portion 39 serving as a second thickness-reduced part formed at a peripheral edge between an axially outboard side wall 37d of the engagement groove 37c and the step portion outer peripheral surface 37a, like a second modified embodiment shown in FIG. 10. Thereby, even when the engagement claws 49 are formed at an early stage of the crushing processing, the engagement claws 49 are securely formed in the engagement groove 37c because it is possible to further securely prevent the interference with the step portion outer peripheral surface 37a of the small-diameter step portion 37.

In the meantime, the tapered portion 39 shown in FIG. 10 may be configured by a convex curved surface part or a concave curved surface part.

In the meantime, the present invention is not limited to the above embodiment and modified embodiments and can be appropriately changed and improved.

For example, in the above embodiment, the engagement claws are formed at the three places of the inner periphery of the retainer plate. However, the present invention is not limited thereto. For example, the engagement claws may be formed at two places or four or more places on the inner periphery of the retainer plate.

Also, in the above embodiment, the engagement groove is formed on the outer peripheral surface of the small-diameter step portion over the entire circumference. However, the present invention is not limited thereto. For example, a plurality of circumferentially extending engagement grooves may be formed at the places, at which the engagement claws are to be formed, on the outer peripheral surface of the small-diameter step portion.

The subject application is based on a Japanese Patent Application No. 2014-173031 filed Aug. 27, 2014, which is herein incorporated by reference.

DESCRIPTION OF REFERENCE NUMERALS

10: bearing device, 30: radial rolling bearing (rolling bearing), 31: outer ring, 31a: outer peripheral surface, 33: inner ring, 35: ball (rolling element), 37: small-diameter step portion, 37a: step portion outer peripheral surface, 37b: step surface, 37c: engagement groove, 39: tapered portion (second thickness-reduced part), 40: retainer plate, 41: small-diameter hole portion, 42: large-diameter hole portion, 48: tapered portion (first thickness-reduced part), 49: engagement claw, C: radial gap between outer peripheral surface of small-diameter step portion and small-diameter hole portion

The invention claimed is:

1. A bearing device comprising:
   a rolling bearing having an inner ring, an outer ring having a small-diameter step portion provided on an outer periphery of an axial end portion thereof, and a plurality of rolling elements arranged to be freely rollable between the inner ring and the outer ring, and
   a retainer plate attached to the outer ring so as to be relatively rotatable and configured to fix the rolling bearing to a housing,
   wherein an engagement groove extending in a circumferential direction is formed on an outer peripheral surface of the small-diameter step portion,
   wherein an inner peripheral surface of the retainer plate has a step shape having a small-diameter hole portion configured to face the outer peripheral surface of the small-diameter step portion and a large-diameter hole portion having an inner diameter greater than the small-diameter hole portion and configured to face an outer peripheral surface of the outer ring,
   wherein a radial gap between the outer peripheral surface of the outer ring and the large-diameter hole portion is set smaller than a radial gap between the outer peripheral surface of the small-diameter step portion positioned at a more axially outboard side than the engagement groove and the small-diameter hole portion so that the retainer plate is to be guided along the outer ring in the large-diameter hole portion, and
   wherein the retainer plate has a plurality of engagement claws protruding radially inward from an inner periphery of the retainer plate defining the small-diameter hole portion and to be engaged with the engagement groove.

2. The bearing device according to claim 1,
   wherein the retainer plate has a first thickness-reduced part formed at a peripheral edge between the inner peripheral surface of the small-diameter hole portion and a side surface of the retainer plate, and
   wherein the engagement claws are formed by axially pressing the inner periphery of the retainer plate, including at least the first thickness-reduced part.

3. The bearing device according to claim 2,
   wherein the outer ring has a second thickness-reduced part formed at a peripheral edge between the outer peripheral surface of the small-diameter step portion and a side surface of the engagement groove.

4. The bearing device according to claim 1,
   wherein the outer ring has a second thickness-reduced part formed at a peripheral edge between the outer peripheral surface of the small-diameter step portion and a side surface of the engagement groove.

5. A method for manufacturing a bearing device, the bearing device comprising:
   a rolling bearing having an inner ring, an outer ring having a small-diameter step portion provided on an outer periphery of an axial end portion thereof, and a plurality of rolling elements arranged to be freely rollable between the inner ring and the outer ring, and
   a retainer plate attached to the outer ring so as to be relatively rotatable and configured to fix the rolling bearing to a housing,
   the method comprising:
   forming a circumferentially extending engagement groove on an outer peripheral surface of the small-diameter step portion,
   forming an inner peripheral surface of the retainer plate into a step shape having a small-diameter hole portion configured to face the outer peripheral surface of the small-diameter step portion and a large-diameter hole portion having an inner diameter greater than the small-diameter hole portion and configured to face an outer peripheral surface of the outer ring,
   setting a radial gap between the outer peripheral surface of the outer ring and the large-diameter hole portion to be smaller than a radial gap between the outer peripheral surface of the small-diameter step portion positioned at a more axially outboard side than the engagement groove and the small-diameter hole portion, and
   setting the retainer plate on the rolling bearing by guiding the large-diameter hole portion along the outer peripheral surface of the outer ring, forming engagement claws by axially pressing an inner periphery of the retainer plate defining the small-diameter hole portion and plastically deforming the inner periphery of the retainer plate so as to bulge radially inward, and engaging the engagement claws with the circumferentially extending engagement groove formed on the outer peripheral surface of the small-diameter step portion.

* * * * *